June 12, 1945.  P. G. COLEMAN  2,377,996
LEVEL-WIND MECHANISM
Filed May 24, 1944  2 Sheets-Sheet 1
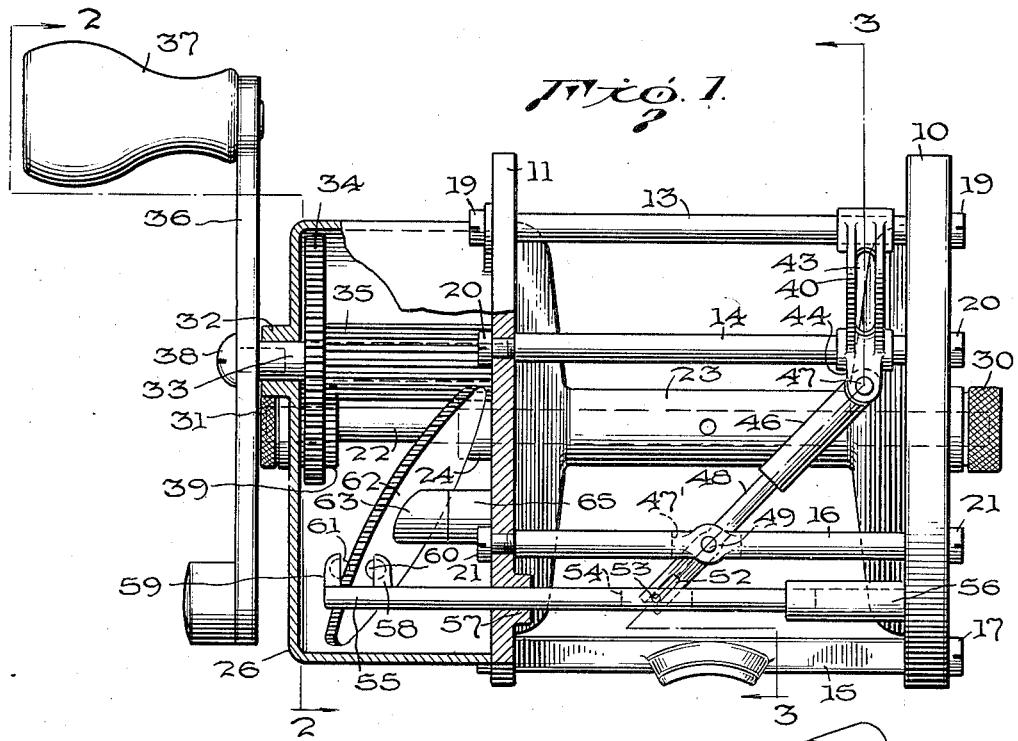
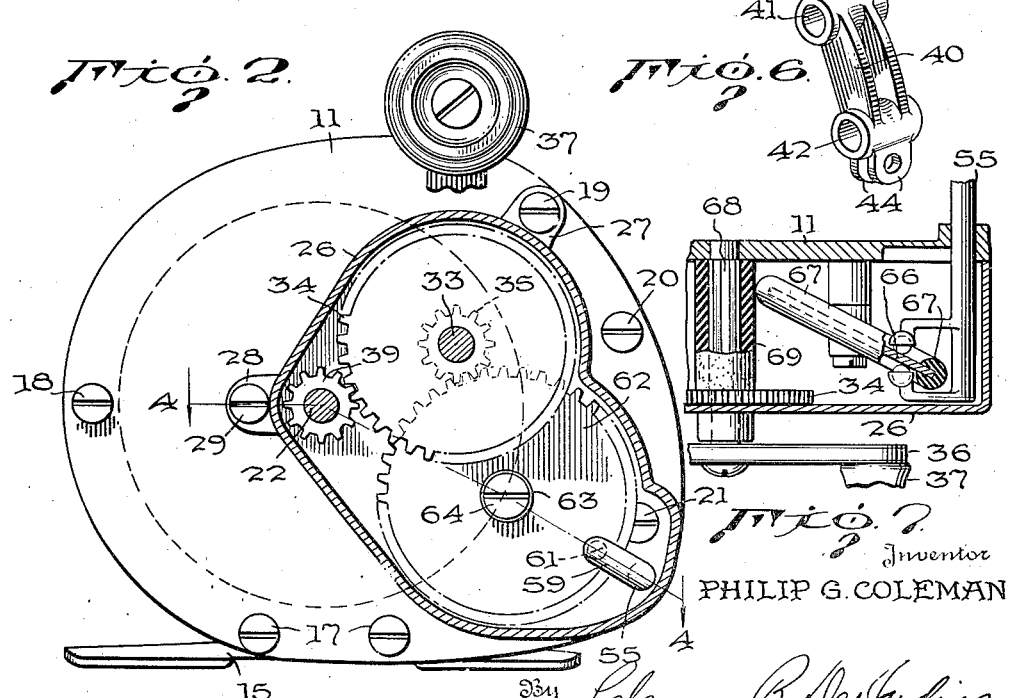
Inventor
PHILIP G. COLEMAN
By Clarence B. Desjardins
His Attorney

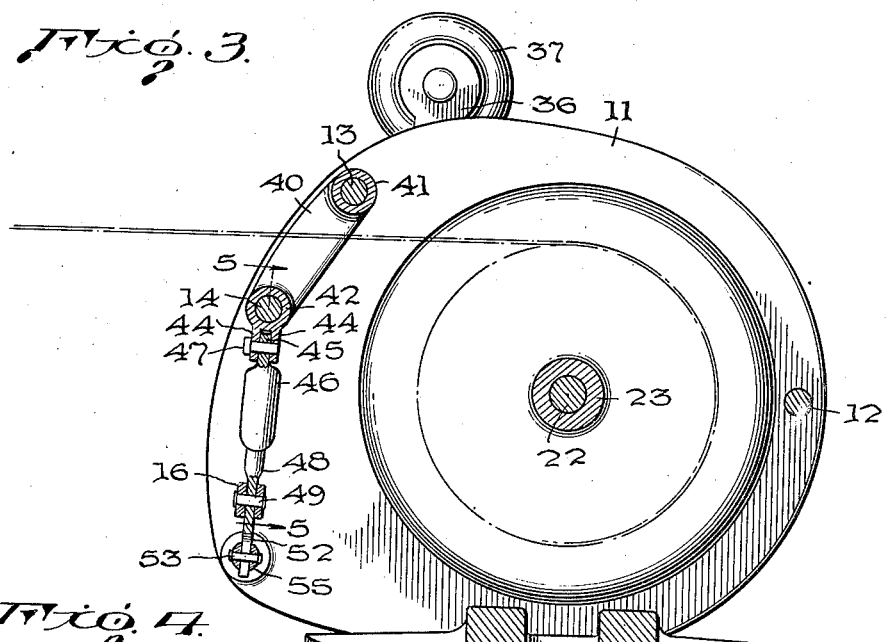
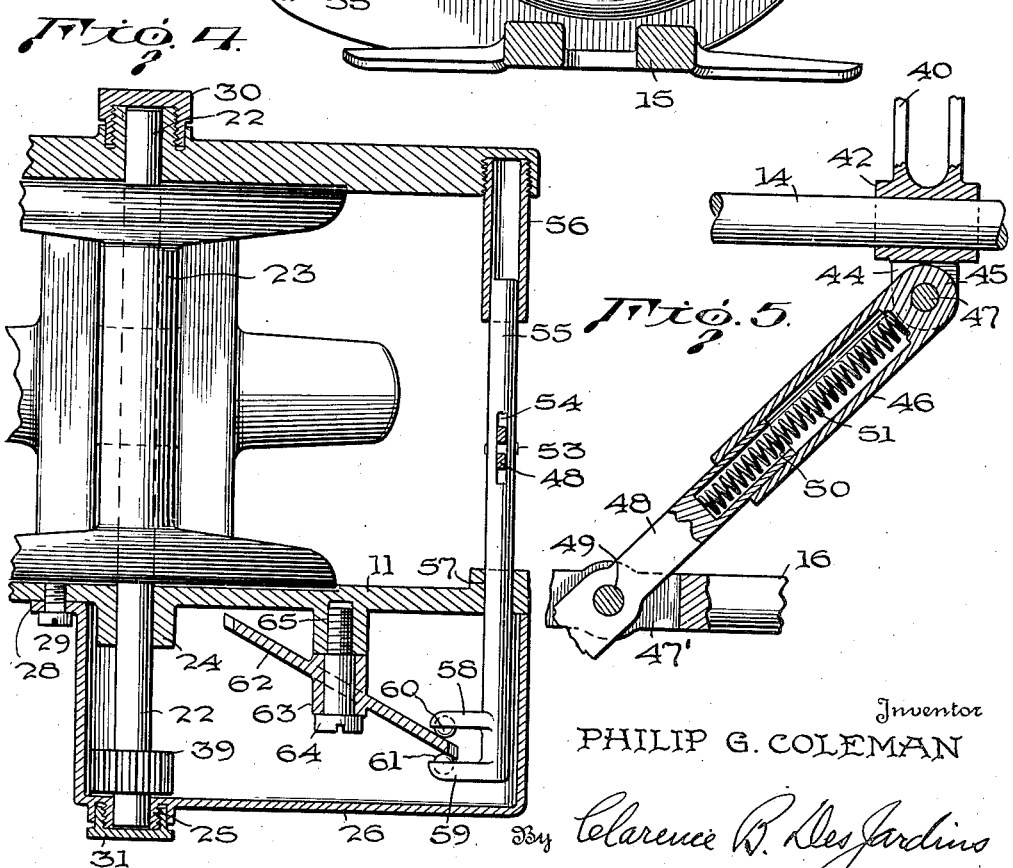

Patented June 12, 1945

2,377,996

UNITED STATES PATENT OFFICE 2,377,996

LEVEL-WIND MECHANISM

Philip G. Coleman, Jacksonville, Fla.

Application May 24, 1944, Serial No. 537,079

14 Claims. (Cl. 242—84.4)

My invention relates to improvements in level-wind mechanism and has to do, more particularly, with improvements in mechanisms of this character such as may be used, for instance, in connection with fishing reels.

The principal object of my invention is to provide a level-wind mechanism for reels that will be simple and sturdy in construction, economical to manufacture, and in which the parts are so constructed and combined as to prevent foreign material from getting into the operating mechanism.

A further object of my invention is to provide a level-wind mechanism for reels that will be more efficient in operation, inasmuch as there are no delicate parts exposed to the elements and likely to rust or corrode so as to interfere with the action of the mechanism.

A further object of my invention is to provide a level-wind mechanism of such construction that the drag of the mechanism against the spool will be considerably reduced.

A further object of my invention is to provide a simple level-wind mechanism by means of which the line may be laid evenly upon the spool.

Further objects, and objects relating to details of construction and economies of operation, will definitely appear from the detailed description to follow. In one instance, I have accomplished the objects of my invention by the devices and means described in the following specification. My invention is clearly defined and pointed out in the appended claims. A structure, constituting a preferred embodiment of my invention, is illustrated in the accompanying drawings, forming a part of this specification, in which Fig. 1 is a view of a fishing reel embodying my invention, taken partly in rear elevation and partly in section.

Fig. 2 is a sectional view, taken on the line 2—2 of Fig. 1.

Fig. 3 is a sectional view, taken on the line 3—3 of Fig. 1.

Fig. 4 is a detail, sectional view, taken through the operating mechanism for the level-wind device on the line 4—4 of Fig. 2.

Fig. 5 is a detail, sectional view, taken on the line 5—5 of Fig. 3.

Fig. 6 is a perspective view of the line guide, and

Fig. 7 is a detail view, corresponding to a part of Fig. 1, but showing a modified form of my invention.

In the drawings, the same reference numerals refer to the same parts throughout the several views and the sectional views are taken looking in the direction of the arrows at the ends of the section lines.

In general, my invention comprises a line guide slidably mounted on the frame of the reel so as to reciprocate along a path parallel to the axis of the spool, on which the line is wound, a rod which is reciprocated along a path parallel to the axis of said spool and a lever fulcrumed on the frame and connected, at its ends, to the line guide and rod, respectively. The means for reciprocating said rod may consist of a disc mounted to rotate about an axis and inclined to said axis, connections between the disc and the rod whereby rotation of the disc about its axis reciprocates said rod, and means for driving the disc from the usual means for driving the rotatable spool of the reel. The connections between the disc and the rod may take the form of a jaw at one end of the rod engaging the edge of the inclined disc. The inclined disc may have its periphery provided with teeth forming a gear, and the means for driving said disc may take the form of a pinion driven by the spool driving means and meshing with said gear.

The reciprocating rod, which drives the level-wind mechanism, is so connected as to reciprocate at a regular, uniform rate bearing a fixed relation to the rate of rotation of the spool. In order that the line guide may be operated by said rod, so as to reciprocate back and forth across the reel at a regular and uniform rate bearing a fixed relation to the rate of rotation of the spool, I provide a lever fulcrumed on the frame and having, at one end, a connection with the rod and at the other a connection with the line guide, the construction of the lever and its connections being such that the ratio of the effective length of the lever arm connected to the rod to the effective length of the lever arm connected to the line guide aways remains the same, whereby the reciprocation of the rod at a regular, uniform rate will result in the reciprocation of the line guide at a corresponding, regular, uniform rate. To this end, the connection between the shorter lever arm and the reciprocating rod may be a pin and slot connection, while the other arm of the lever may consist of two telescoping parts, one of them being pivotally connected to the line guide.

Referring to the numbered parts of the drawings, the level-wind mechanism of my invention is embodied in a fishing reel comprising a frame formed of the end plates 10 and 11, assembled in spaced relation to each other by the rods 12, 13, 14, and 16, and the bracket 15, by which the reel may be detachably fastened to the fishing rod. Bracket 15 is secured to the end plates by the screws 17, and the rods 12, 13, 14 and 16 are secured to the end plates by the screws 18, 19, 20 and 21, respectively.

A shaft 22 is journaled in the end plates 10 and 11 and the spool 23, on which the fishing line is wound, is mounted on the shaft 22 between said end plates. Shaft 22 is journaled in a bearing 24 formed on the end plate 11 and its outer end is also journaled in a bearing 25 formed in a casing 26, which surrounds the spool driving and level-wind operating mechanism and has ears 27 and 28 engaging the end plate 11 and secured thereto by the screws 19 and 29. The bearing for one end of shaft 22 is closed by a removable cap 30 screwed upon the end plate 10, while the bearing 25 for the other end of said shaft is closed by the removable cap 31, screwed upon casing 26.

Hub 33 of a gear 34 is journaled in a bearing 32 provided on the casing 26, and a barrel pinion 35, preferably formed integral with gear 34, extends from said gear to the end plate 11, being suitably journaled in the latter. Crank 36 is secured to hub 33 by screw 38 and provided with a handle 37, and gear 34 and barrel pinion 35 can be rotated by turning the crank 36. Gear 34 meshes with pinion 39 secured on the spool shaft 22, so that rotation of crank 36 not only drives gear 33, but also drives pinion 35 and the spool on which the line is wound. The ratio between gear 34 and pinion 35, in this instance, is such that each revolution of crank 36 will result in 8 revolutions of spool 23.

The level-wind mechanism comprises a line guide 40 having bearings 41, 42, by which it is mounted slidably upon the rods 13 and 14 so as to reciprocate along a path parallel to the axis of spool 23. Line guide 40 has an elongated eye 43, through which the line passes from the spool 23, and a pair of spaced ears 44 project downwardly from the lower portion of guide 40. These receive between them the ear 45 on the upper end of a hollow sleeve 46, which is pivotally connected to the ears 44 by the pin 47. A lever 48 extends through a slot 47, formed in the rod 16, and is fulcrumed thereon by means of the pin 49. The upper end of lever 48 is tubular, as at 50, and slides within sleeve 46. A spring 51 is housed within sleeve 46 and compressed between the top thereof and the bottom of the tubular portion 50 of lever 48. The portion of lever 48 extending below the pivot 49 is flattened and extends through a slot 54 formed in a reciprocating operating rod 55. Lever 48 has a notch 52 therein, which receives a pin 53 carried by rod 55 and extending across the slot 54.

The level-wind operating rod 55 is slidably mounted, at one end, in a sleeve 56 screwed into the end plate 10 and extending therefrom toward the end plate 11. At the other end, rod 55 is slidable in a bearing 57, formed in end plate 11, and extends into the chamber formed by end plate 11 and casing 26. At this end, the rod 55 is provided with a jaw comprising projecting lugs 58, 59, forming housings which receive anti-friction balls 60 and 61, engaging opposite faces of an inclined gear 62. This gear meshes with the barrel pinion 35, as shown in Fig. 1, and is driven thereby, and is of such oval contour that its projection on a plane at right angles to its axis will be a true circle, as shown in Fig. 2. It has a hub 63 journaled on a shouldered stud 64, screwed into a socket 65, formed in the end plate 11, so that gear 62 is rotatable about an axis parallel to the axis of the spool 23, but lies in a plane inclined to said axis. It will be evident that, as gear 34 and pinion 35 are rotated by turning the crank 36, gear 62 will be rotated about its axis and will reciprocate the operating rod 55 along a path parallel to the axis of spool 23, and thereby lever 48 will be rocked and the line guide 40 will be caused to reciprocate on the rods 13 and 14. The ratio between pinion 35 and gear 62, in this instance, is such that it requires 8 revolutions of pinion 35 to produce one revolution of gear 62. Thus, there will be one revolution of gear 62, or one complete reciprocation of rod 55 and line guide 40, for each 64 revolutions of spool 23. These illustrative gear ratios assume that the spool 23 is of such size as to hold 32 turns of line side by side upon it.

The operation of the level-wind mechanism of my invention should be quite clear from the description of the parts given above. Rotation of gear 33 and pinion 34, caused by spinning crank 36, not only drives spool 23 but also gear 62 and, thereby, causes the reciprocation of rod 55. The reciprocation of this rod rocks lever 48 and causes the reciprocation of line guide 40 upon the rods 13 and 14. Due to the fact that the upper arm of lever 48 is formed of the telescoping parts 46 and 50, one of which is pivotally connected to the line guide, and the lower arm of lever 48 has a notch 52 which receives pin 53 on the operating rod, the ratio between the effective lengths of the upper and lower arms of this lever will always be the same and reciprocatory motion of rod 55 will be transmitted to line guide 40 to cause the reciprocation of the line guide upon the rods 13 and 14. Thus, the line will be laid evenly across the spool.

Instead of providing a gear drive for the reciprocating rod 55, I may provide an inclined disc 66, mounted as shown in Fig. 7, and having, on its periphery, a tire 67, of rubber, or like yielding material, which contacts with a layer 69 of rubber, or like yielding material, on a hub 68 integral with the gear 34, and which takes the place of the barrel pinion 35. Thus, a friction drive instead of the gear drive may be used, provided it is such that there is no substantial slipping between disc 66 and hub 68.

I am aware that the mechanism shown herein may be varied considerably, without departing from the spirit of my invention, and, therefore, I claim my invention broadly, as indicated by the appended claims.

Having thus described my invention, what I claim as new and desire to secure by Letters Patent is:

1. In a reel including a frame, a rotatable spool on which the line is wound and means for driving said spool, a level-wind mechanism comprising the combination of a disc journaled to rotate about an axis and lying in a plane inclined to said axis; means for driving said disc from said spool driving means; a rod slidably mounted on said frame for reciprocation and having a jaw at one end receiving the edge of said disc; a telescoping lever fulcrumed on said frame and having one end connected to said rod; and a line guide having an elongated eye, slidably mounted on said frame for reciprocation and connected to the other end of said lever.

2. In a reel including a frame, a rotatable spool on which the line is wound and means for driving said spool, a level-wind mechanism comprising the combination of a disc journaled to rotate about an axis and lying in a plane inclined to said axis; means for driving said disc from said spool driving means; a rod slidably mounted on said frame for reciprocation and having a jaw at one end receiving the edge of said disc; a lever fulcrumed on said frame and having one end connected to said rod; a line guide having an elongated eye and slidably mounted on said frame for reciprocation; and a sleeve pivotally connected to said line guide and telescopically mounted on the other end of said lever.

3. In a reel including a frame, a rotatable spool on which the line is wound and means for driving said spool, a level-wind mechanism comprising the combination of a disc journaled to rotate about an axis and lying in a plane inclined to said axis; means for driving said disc from said spool driving means; a rod slidably mounted on said frame for reciprocation and having a jaw at one end receiving the edge of said disc; a lever fulcrumed on said frame and having one end connected to said rod; a line guide having an elongated eye and slidably mounted on said frame for reciprocation; a sleeve pivotally connected to said line guide and slidably receiving the other end of said lever; and a spring housed in said sleeve and compressed between the sleeve and said lever.

4. In a reel including a frame, a rotatable spool on which the line is wound and means for driving said spool, a level-wind mechanism comprising the combination of a line guide slidably mounted on said frame for reciprocation along a path parallel to the axis of said spool; an operating rod mounted in said frame for reciprocation in a path parallel to the axis of said spool; means actuated by the spool driving means for reciprocating said rod; and a lever fulcrumed on said frame, one arm of which has a pin and slot connection with said rod and the other arm of which comprises telescoping parts one of said parts being pivotally connected to said line guide.

5. In a reel including a frame, a rotatable spool on which the line is wound and means for driving said spool, a level-wind mechanism comprising the combination of a gear journaled to rotate about an axis and lying in a plane inclined to said axis; means for driving said gear from said spool driving means; a rod slidably mounted on said frame for reciprocation; connections between said inclined gear and said rod for reciprocating the latter as said gear rotates about its axis; a lever fulcrumed on said frame and having one end connected to said rod; and a line guide slidably mounted on said frame for reciprocation and connected to the other end of said lever.

6. In a reel including a frame, a rotatable spool on which the line is wound and means for driving said spool, a level-wind mechanism comprising the combination of a pinion driven by said spool driving means; a gear meshing with said pinion, journaled to rotate about an axis and lying in a plane inclined to said axis; a rod slidably mounted on said frame for reciprocation and having a jaw at one end receiving the edge of said gear; a lever fulcrumed on said frame and having one end connected to said rod; and a line guide slidably mounted on said frame for reciprocation and connected to the other end of said lever.

7. In a reel including a frame, a rotatable spool on which the line is wound and means for driving said spool, a level-wind mechanism comprising the combination of a gear journaled to rotate on an axis parallel to the axis of said spool and lying in a plane inclined to said axis; means for driving said gear from said spool driving means; a rod slidably mounted on said frame for reciprocation in a path parallel to the axis of said spool; connections between said inclined gear and said rod for reciprocating the latter as said gear rotates about its axis; a lever fulcrumed on said frame and having one end connected to said rod; and a line guide slidably mounted on said frame for reciprocation along a path parallel to the axis of said spool and connected to the other end of said lever.

8. In a reel including a frame, a rotatable spool on which the line is wound and means for driving said spool, a level-wind mechanism comprising the combination of a pinion driven by said spool driving means; a gear meshing with said pinion, journaled to rotate on an axis parallel to the axis of said spool and lying in a plane inclined to said axis; a rod slidably mounted on said frame for reciprocation in a path parallel to the axis of said spool; connections between said inclined gear and said rod for reciprocating the latter as said gear rotates about its axis; a lever fulcrumed on said frame and having one end connected to said rod; and a line guide slidably mounted on said frame for reciprocation along a path parallel to the axis of said spool and connected to the other end of said lever.

9. In a reel including a frame, a rotatable spool on which the line is wound and means for driving said spool, a level-wind mechanism comprising the combination of a pinion driven by said spool driving means; a gear meshing with said pinion, journaled to rotate on an axis parallel to the axis of said spool and lying in a plane inclined to said axis; a rod slidably mounted on said frame for reciprocation in a path parallel to the axis of said spool and having a jaw at one end receiving the edge of said gear; a lever fulcrumed on said frame and having one end connected to said rod; and a line guide slidably mounted on said frame for reciprocation along a path parallel to the axis of said spool and connected to the other end of said lever.

10. In a reel including a frame, a rotatable spool on which the line is wound and means for driving said spool, a level-wind mechanism comprising the combination of a pinion driven by said spool driving means; a gear meshing with said pinion, journaled to rotate on an axis parallel to the axis of said spool and lying in a plane inclined to said axis; a rod slidably mounted on said frame for reciprocation in a path parallel to the axis of said spool and having a jaw at one end receiving the edge of said gear; a telescoping lever fulcrumed on said frame and having one end connected to said rod; and a line guide slidably mounted on said frame for reciprocation along a path parallel to the axis of said spool and pivotally connected to the other end of said lever.

11. In a reel including a frame, a rotatable spool on which the line is wound and means for driving said spool, a level-wind mechanism comprising the combination of a pinion driven by said spool driving means; a gear meshing with said pinion, journaled to rotate on an axis parallel to the axis of said spool and lying in a plane inclined to said axis; a rod slidably mounted on said frame for reciprocation in a path parallel to the axis of said spool and having a jaw at one end receiving the edge of said gear; a telescoping lever fulcrumed on said frame and having one end connected to said rod; and a line guide having an elongated eye, slidably mounted on said frame for reciprocation along a path parallel to the axis of said spool and pivotally connected to the other end of said lever.

12. In a reel including a frame, a rotatable spool on which the line is wound and means for driving said spool, a level-wind mechanism comprising the combination of a pinion driven by said spool driving means; a gear meshing with said pinion, journaled to rotate on an axis parallel to the axis of said spool and lying in a plane inclined to said axis; a rod slidably mounted on said frame for reciprocation in a path parallel to the axis of said spool and having a jaw at one end receiving the edge of said gear; a lever fulcrumed on said frame and having one end connected to said rod; a line guide having an elongated eye and slidably mounted on said frame for reciprocation along a path parallel to the axis of said spool; and a sleeve pivotally connected to said line guide and slidably receiving the other end of said lever.

13. In a reel including a frame, a rotatable spool on which the line is wound and means for driving said spool, a level-wind mechanism comprising the combination of a pinion driven by said spool driving means; an oblong gear meshing with said pinion, journaled to rotate on an axis parallel to the axis of said spool and lying in a plane inclined to said axis; a rod slidably mounted on said frame for reciprocation in a path parallel to the axis of said spool and having a jaw at one end receiving the edge of said gear; a lever fulcrumed on said frame and having one end connected to said rod; a line guide having an elongated eye and slidably mounted on said frame for reciprocation along a path parallel to the axis of said spool; and a sleeve pivotally connected to said line guide and slidably receiving the other end of said lever.

14. In a reel including a frame, a rotatable spool on which the line is wound and means for driving said spool, a level-wind mechanism comprising the combination of a pinion driven by said spool driving means; an oblong gear meshing with said pinion, journaled to rotate on an axis parallel to the axis of said spool and lying in a plane inclined to said axis; a rod slidably mounted on said frame for reciprocation in a path parallel to the axis of said spool and having a jaw at one end receiving the edge of said gear; a lever fulcrumed on said frame and having one end connected to said rod; a line guide having an elongated eye and slidably mounted on said frame for reciprocation along a path parallel to the axis of said spool; a sleeve pivotally connected to said line guide and slidably receiving the other end of said lever; and a spring housed in said sleeve and compressed between the sleeve and said lever.

PHILIP G. COLEMAN.